Sept. 14, 1954     W. L. CARLSON     2,688,793
METHOD OF MAKING COMMUTATORS
Filed June 28, 1951     3 Sheets-Sheet 1
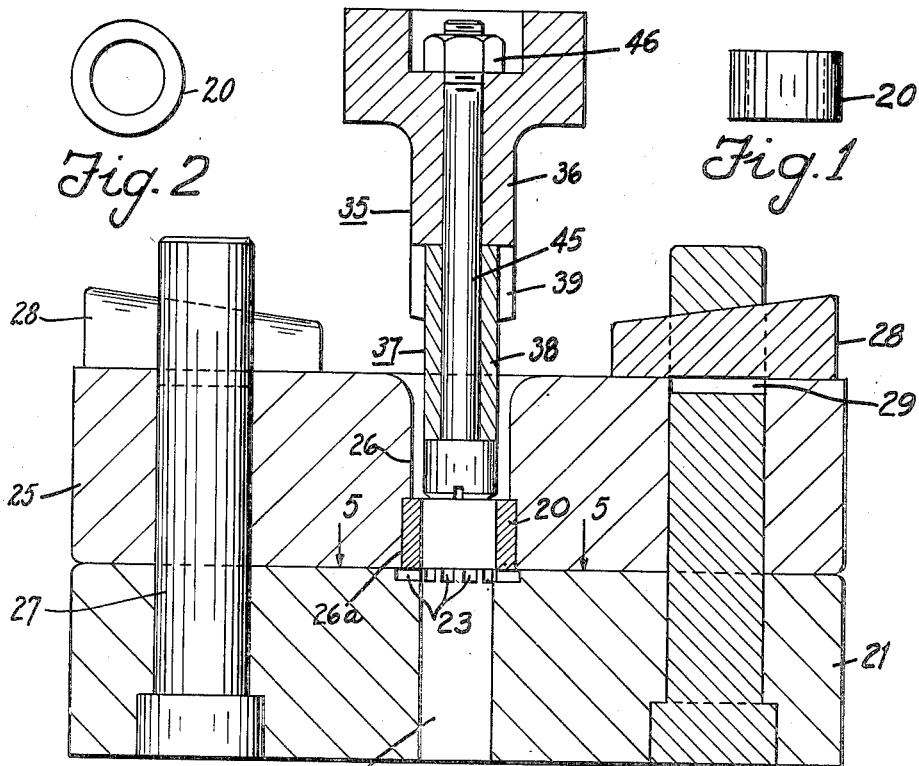
Fig. 1
Fig. 2
Fig. 3
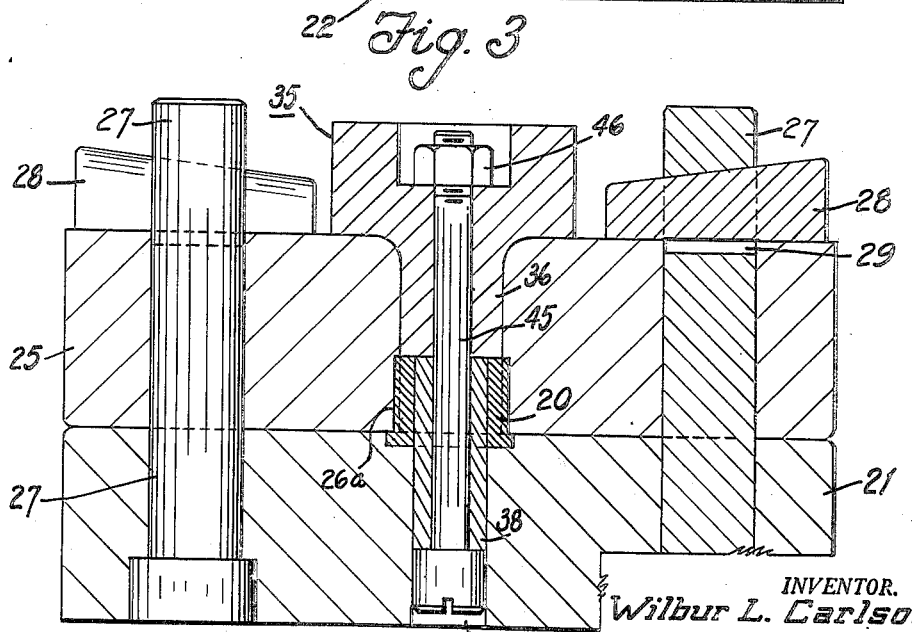
Fig. 4
INVENTOR.
Wilbur L. Carlson
BY
Willits, Hardman & Fehr
HIS ATTORNEYS Sept. 14, 1954     W. L. CARLSON     2,688,793
METHOD OF MAKING COMMUTATORS
Filed June 28, 1951                3 Sheets-Sheet 2

INVENTOR.
Wilbur L. Carlson
BY
Willits, Hardman & Fehr
HIS ATTORNEYS

INVENTOR.
Wilbur L. Carlson
BY
Willits, Hardman & Fehr
HIS ATTORNEYS

Patented Sept. 14, 1954

2,688,793

UNITED STATES PATENT OFFICE 2,688,793

METHOD OF MAKING COMMUTATORS

Wilbur L. Carlson, Rochester, N. Y., assignor to General Motors Corporation, Detroit, Mich., a corporation of Delaware Application June 28, 1951, Serial No. 234,048

4 Claims. (Cl. 29—155.54)

This invention relates to commutators for electric motors and the method of making same.

An object of the present invention is to provide improved and simplified commutator construction.

Another object of the present invention is to provide improved methods of making commutators.

Another object of the present invention is to provide a riser type commutator and a method of producing it which is suitable for commutators of small diameter with a plurality of segments, and which will have the segments anchored in a core of insulating material.

The above objects are accomplished by forming equally spaced inwardly extending keystone-shaped ribs within a metallic sleeve and coining a series of keystone-shaped elements at one end of the sleeve in axial alignment with the ribs. The thus formed sleeve is then placed in a mold and a thermosetting material is placed in the mold and the whole is subjected to heat and pressure so that the ribs are embedded in the molding material. To complete the commutator the sleeve is cut longitudinally between the risers dividing the metal tube into a plurality of commutator segments.

Further objects and advantages of the present invention will be apparent from the following description, reference being had to the accompanying drawings wherein a preferred embodiment of the present invention is clearly shown.

Referring to the drawings:

Fig. 1 is a side elevational view showing a tube of electrically conducting material from which the segments and risers of the commutator are to be made.

Fig. 2 is an end view of the sleeve.

Fig. 3 is a vertical axial section through a die member with the tube in place and a broaching tool ready to force portions of the metal of the sleeve in recesses in the lower die member.

Fig. 4 shows the same cross section as Fig. 3 except that broach tool is forced into the sleeve.

Figure 9:
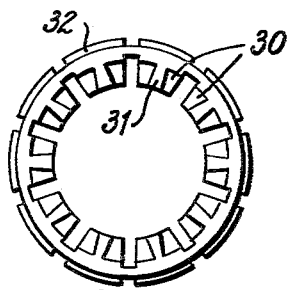
Figure 6:
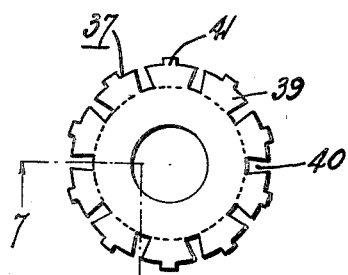
Fig. 6 is a top plan view of the broaching tool on a large scale.
Figure 8:
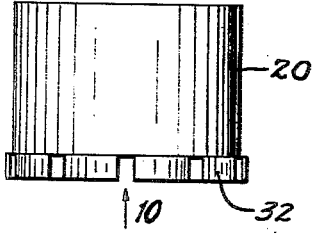
Fig. 8 is a side elevational view of the sleeve after the broach has been forced into the sleeve shown in Fig. 1, but on a larger scale.
Figure 7:
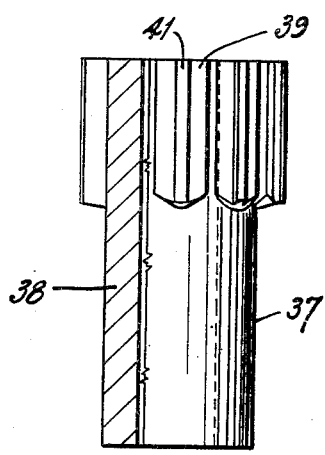
Fig. 7 is a sectional view taken on line 7—7 of Fig. 6.
Figure 10:
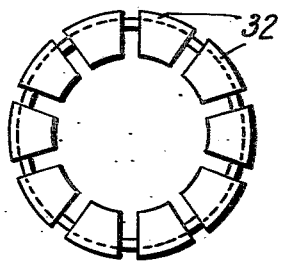

Figs. 9 and 10 are end views of the tube looking in the direction of arrow 9 and arrow 10 respectively in Fig. 8.

Figure 11:
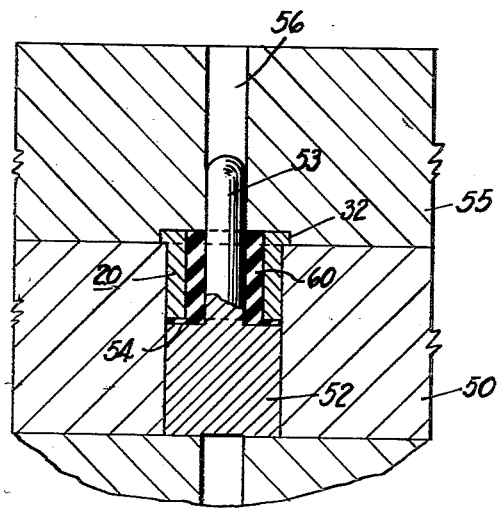

Fig. 11 shows a mold in which an insulating core has been molded into a metal sleeve shown in Fig. 9, the mold being closed as it appears after the molding of the core is completed.

Figure 12:
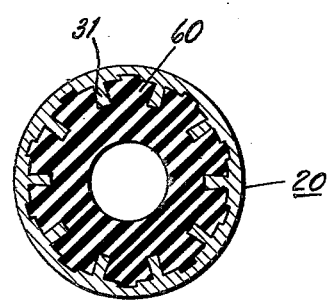

Fig. 12 is a transverse section of the sleeve after the core is molded in the sleeve.

Figure 13:
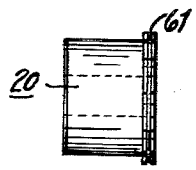

Fig. 13 is a side elevational view of the core showing an annular groove cut in the riser.

Figure 14:
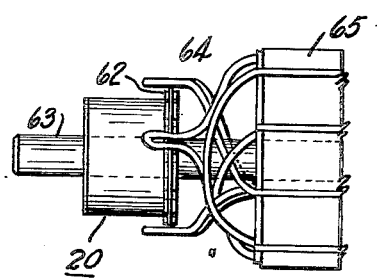

Fig. 14 is a detail elevation showing lead wires placed in position over a ring of brazing material placed in the riser groove.

Figure 15:
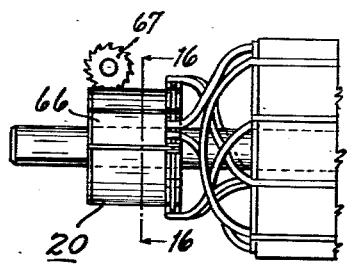

Fig. 15 shows a cutting saw in the process of separating the sleeve into a plurality of segments, after the tube has been assembled on an armature shaft and lead wires are brazed to the risers.

Figure 16:
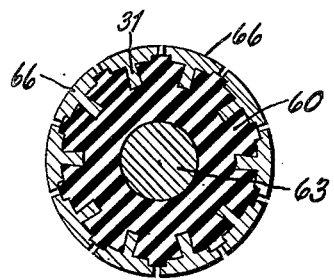

Fig. 16 is a transverse sectional view of a completed commutator.

Figure 5:
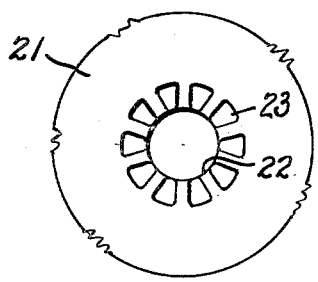
Fig. 5 is a fragmentary plan view of the lower die showing an arrangement of keystone-shape pockets upon which the sleeve is placed.

Referring to the drawings, 20 designates a plain tube or sleeve of ductile electrically conducting material preferably, but not necessarily, of uniform thickness. This sleeve is placed over a lower die plate 21 having an aperture 22. The top surface of the plate 21 is formed with a plurality of spaced keystone-shaped pockets or recesses 23, see Fig. 5, communicating with the aperture 22.

After the sleeve 20 is placed over the pockets the sleeve 20 is clamped in position by an upper die plate 25 having a counterbored opening 26 with the larger portion 26a of the bore receiving the sleeve 20. The upper die is clamped to the lower die by guide post 27 and slip pins or wedge members 28 which fit into opening 29 provided by the posts to force the upper die 25 tightly against the lower die 21.

The inner surface of the sleeve is formed with keystone-shaped grooves 30, keystone-shaped ribs 31 and keystone-shaped risers 32 at one end of the cylinder. These keystone-shape formations are formed by a broaching tool 35 which includes a pusher 36, an extrusion punch 37 having a sleeve portion 38 which has a sliding fit with the internal diameter of the sleeve 20. The upper end of the sleeve 38 carries a plurality of spaced keystone-shaped ribs to provide keystone-shaped grooves 40. Each rib has an extension 41 thereon.

The extrusion punch 35 and the pusher 36 are held in assembled relation by a bolt 45 and a nut 46 as illustrated in Figs. 3 and 4. The cross dimension of the extrusion punch which includes the keystone ribs 39 is greater than the internal cross dimension of the sleeve 20. When the broaching tool is forced into one end of the sleeve 20 the ribs 39 cold flows portions of the metal of the sleeve beyond the other end of the sleeve leaving spaced keystone-shaped ribs therein. During the downward movement of the broaching tool 35 the sleeve portion 38 prevents the metal that is being cold flowed from moving inwardly, thus, in its attempt to escape, the metal flows downwardly into the pockets 23 which coin the metal beyond the other end of the sleeve, into keystone-shaped risers, as shown in Fig. 10. In this instance, the recesses 23 extend beyond the periphery of the sleeve and at right angles thereto.

A center core of insulating material is then molded into the center of the sleeve providing the structure shown in Fig. 12. This may be accomplished by a suitable mold as shown in Fig. 11. In this instance the mold includes a lower body 50 and an upper body 55. The lower body has a cylindrical bore which receives a metal plug 52 having reduced cylindrical shank 53 to form a shoulder 54. The bore also receives one end of the sleeve 20 with the risers 32 resting on the top surface of the body 50. The lower end of the sleeve 20 is spaced from the shoulder 54.

The upper body 55 is concentrically supported on the body 50 and is provided with an opening 56 to receive the shank 53. The lower end of the opening is enlarged to fit closely around the risers 32.

In molding a quantity of plastic molding compound is placed within the cylinder 20. Then pressure is applied to the upper body 55 so that its lower surface will tightly engage the upper surface of the lower body 50. Heat then is applied to heat the mold bodies until the insulating material becomes soft and putty-like and fills the space between the sleeve and shaft and also the space between the shoulder 54 and the lower end of sleeve 20. As is well understood the putty-like insulating material will harden or set to form a body or core 60. When that occurs the keystone shaped rib 31 will be securely anchored in the core or body.

When the structure is removed from the mold, the structure is mounted on a suitable device which is rotated to form an annular arcuate groove 61 in the risers 32 as shown in Fig. 13. A ring 62 of weld material, see Fig. 14, is snapped in the groove. The structure thus formed is then fixed to an armature shaft 63 and lead wires 64 of the armature 65 are placed over the ring 62 and welded to the risers 32 to form the proper connections between the structure and the risers 32.

The sleeve 20 is then divided into a plurality of commutator bars or segments 66 by cutting the sleeve 20 longitudinally between the risers 32. Fig. 15 shows a saw 67 cutting through sleeve 20 opposite the space between adjacent risers. These cutting operations divide the sleeve into the required number of segments 66 which are insulated from each other. The outer surfaces of the segments are machined in a suitable machine to form a true cylinder of the plurality of segments.

Referring to Fig. 12, it may be seen that due to the fact that since the ribs are keystone in shape, the segments 66 are securely anchored in the body 60 so they will not move outwardly due to centrifugal force.

While the drawings, Fig. 13 show the cylinder cut into segments when the sleeve is mounted on the armature shaft it is to be clearly understood that the sleeve with the core therein could be cut into segments to form the commutator and then attached to the armature shaft.

While the embodiment of the present invention as herein disclosed, constitutes a preferred form, it is to be understood that other forms might be adopted.

What is claimed is as follows:

1. A method of producing an article of manufacture comprising the steps which include, supporting one end of a sleeve of ductile metal and confining the outer wall of the sleeve while the sleeve is so supported; forcing a tool having spaced keystone-shaped ribs into the other end of the sleeve to form grooves on the inner surface of said sleeve to cause the metal displaced in forming said grooves to flow beyond the supported end of said sleeve; and then concomitantly coining the displaced metal as it emerges to form spaced portions which extend radially outward beyond the periphery of the sleeve.

2. A method of producing an article of manufacture comprising the steps which include, supporting one end of a sleeve of ductile metal and confining the outer wall of the sleeve while the sleeve is so supported; forcing a tool having spaced keystone-shaped ribs into the other end of the sleeve to form grooves on the inner surface of said sleeve to cause the metal displaced in forming said grooves to flow beyond the supported end of said sleeve; coining the displaced metal as it emerges to form portions which extend radially outward beyond the periphery of the sleeve; and then molding a hollow core of insulating material within the sleeve embedding the ribs.

3. A method of making a commutator comprising the steps which include, supporting one end of a sleeve of ductile metal and confining the outer wall of the sleeve while the sleeve is so supported; forcing a tool having spaced keystone-shaped ribs into the other end of the sleeve to form grooves on the inner surface of said sleeve to cause the metal displaced in forming said grooves to flow beyond the supported end of said sleeve; concomitantly coining the displaced metal as it emerges to form spaced portions which extend radially outward beyond the periphery of the sleeve; molding a core of insulating material within the sleeve embedding the ribs; and then slotting the sleeve through its entire length between the portions and the ribs so as to provide spaced segments of substantially equal width.

4. A method of making a commutator comprising the steps which include, confining the outer wall of a sleeve of ductile metal and also supporting both ends of the sleeve; forcing a broaching tool having keystone-shaped ribs into one end of the sleeve to form keystone-shaped ribs on the inner surface of said sleeve whereby the broached metal is caused to flow beyond the other end of the sleeve; coining the broached metal as it emerges from the other end of the sleeve into spaced keystone-shaped elements in alignment with the ribs, said elements extending radially outward beyond the outer wall of the sleeve; molding an insulating hollow body within the sleeve to embed the ribs; and then cutting through the sleeve through its entire length between the ribs and elements so as to provide spaced segments of equal width.

References Cited in the file of this patent

UNITED STATES PATENTS

| Number | Name | Date |
|---|---|---|
| 1,633,922 | Carter | June 28, 1927 |
| 1,875,204 | Apple | Aug. 30, 1932 |
| 2,038,419 | Cotterman | Apr. 21, 1936 |
| 2,340,529 | Hartman | Feb. 1, 1944 |
| 2,456,118 | Foster | Dec. 14, 1948 |